Feb. 15, 1938.  C. E. SUMMERS  2,108,515
MOTOR MOUNTING
Filed Oct. 22, 1923  4 Sheets-Sheet 1
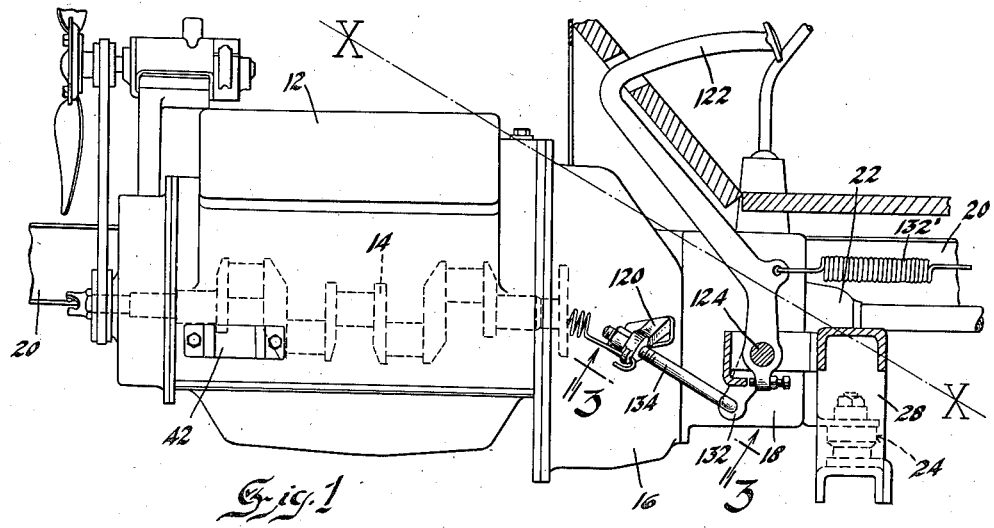
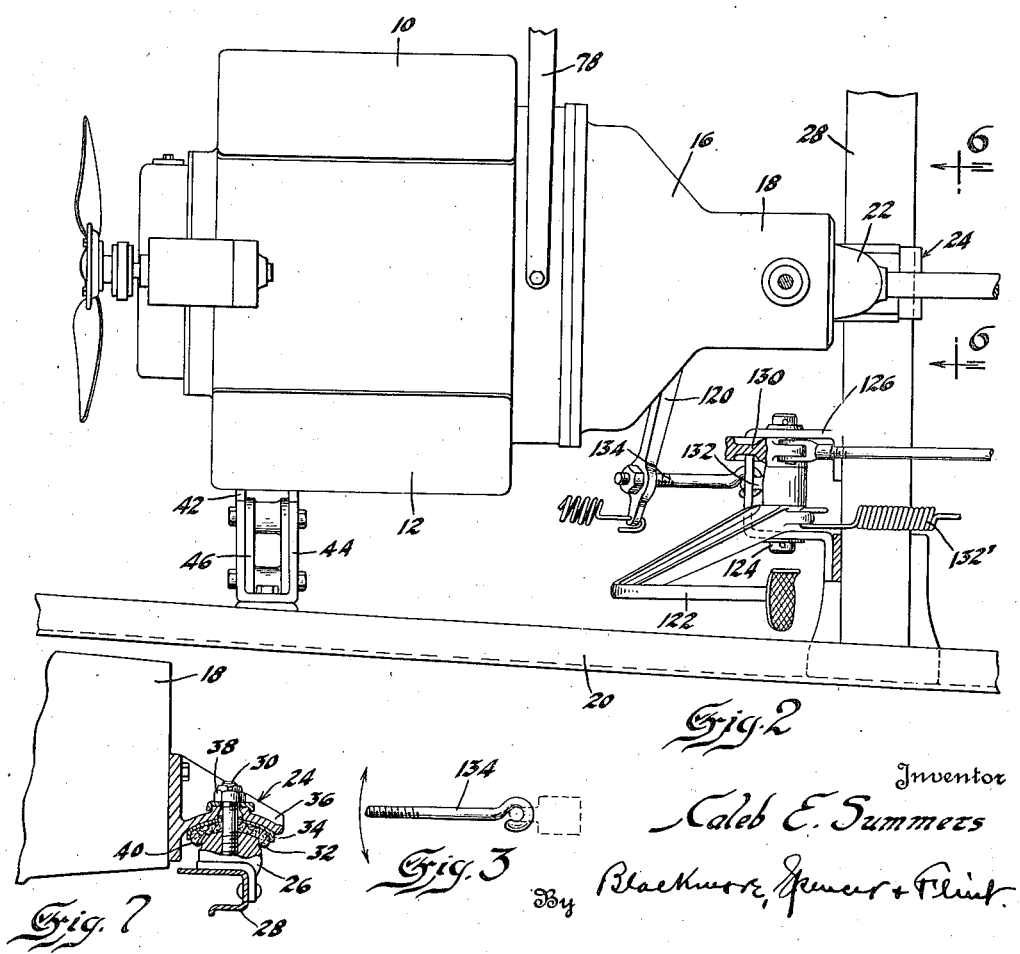

Inventor
Caleb E. Summers
By Blackmore, Spencer & Flint,
Attorney

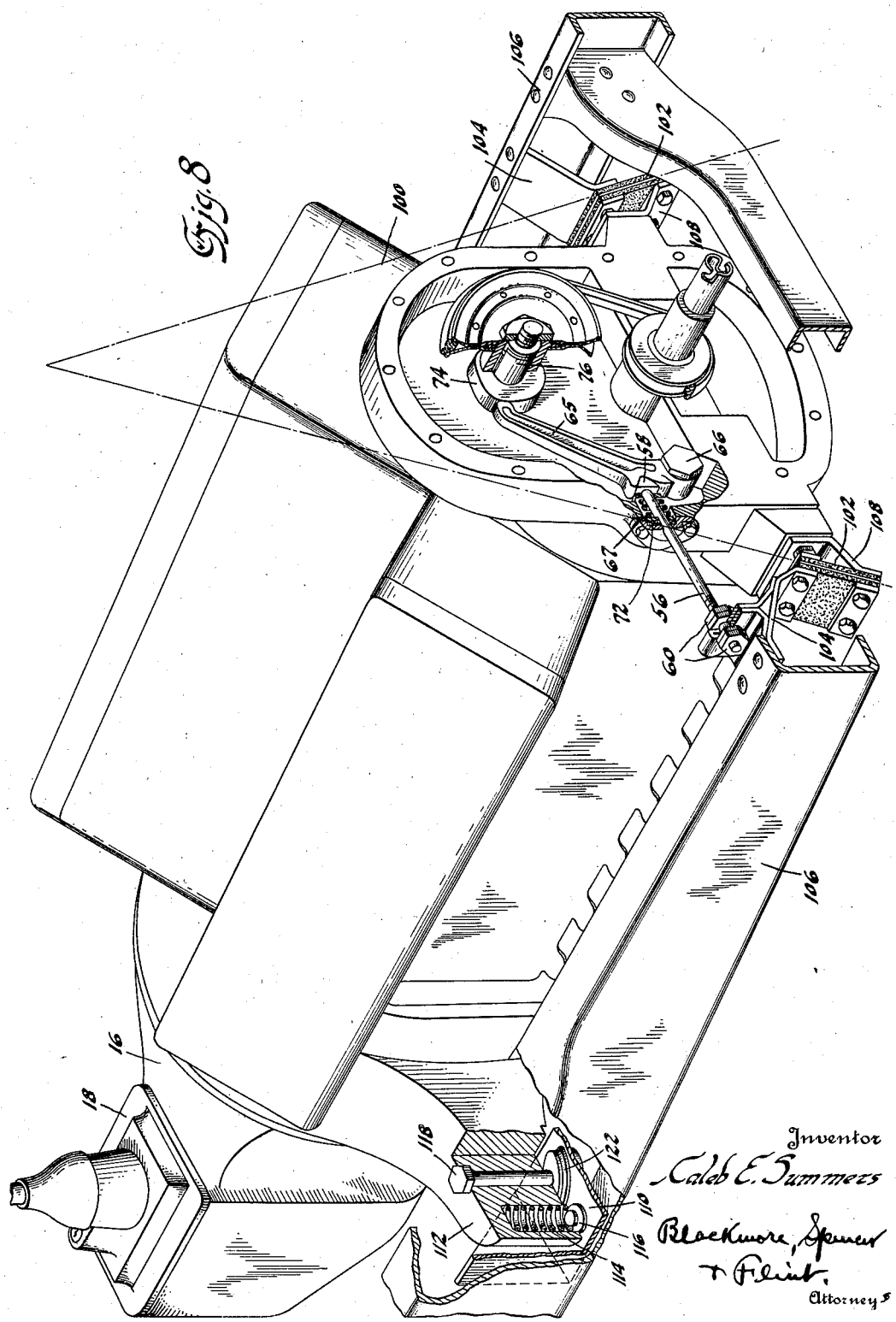

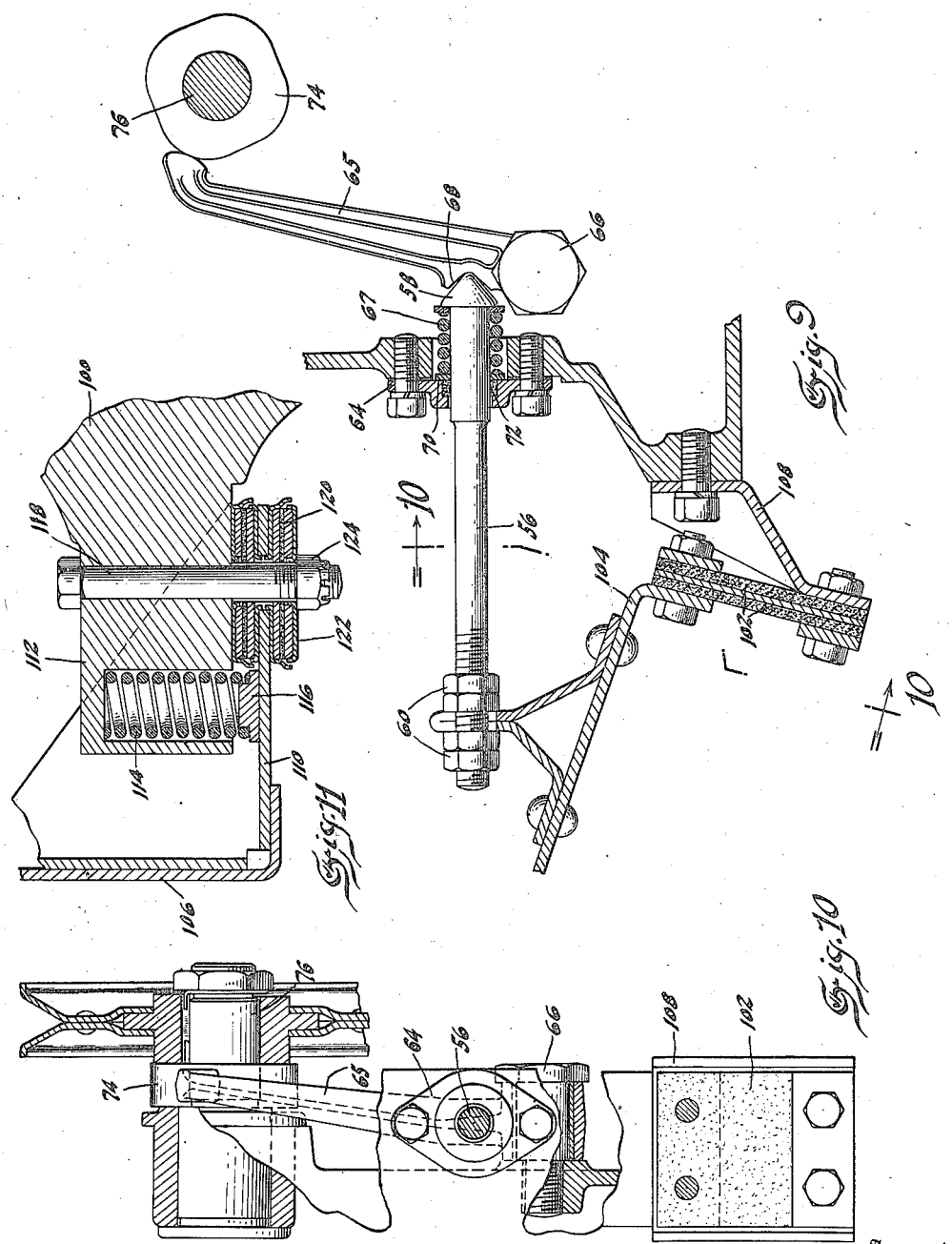

Patented Feb. 15, 1938

2,108,515

UNITED STATES PATENT OFFICE 2,108,515

MOTOR MOUNTING

Caleb E. Summers, Pontiac, Mich., assignor, by mesne assignments, to General Motors Corporation, Detroit, Mich., a corporation of Delaware Application October 22, 1928, Serial No. 314,203

17 Claims. (Cl. 123—192)

This invention has to do with mountings for engines and similar machines, the object being to prevent transmission to the supports or to the operator of the vibrations inherent in the engine during operation. The invention has particular application to engines used in automobiles.

My improved mounting is especially applicable to engines which are subject to lateral vibration or vibration about an axis extending longitudinally thereof. It is so designed as to permit the motor to freely perform its vibratory movement rather than to attempt to confine it in one position as in the conventional mounting. In addition, if desired, means may be provided for bracing the motor against chance vibration, this means being so designed that engine vibration is not transmitted through it to the frame or other part of the car to which it is secured. The engine controls are also preferably so designed that none of the engine vibration will be transmitted through them to the operator.

The underlying principles embodied in this invention can best be explained in the course of the following description of a specific application of it.

I have disclosed my improved mounting applied to an eight cylinder automobile engine of the V type. It is well known that such engines are subject to lateral vibration as a result of unbalanced inertia forces caused by motion of the reciprocating parts, gas torque reaction, and other factors. I have found, after careful investigation, that when a V eight engine of the type herein described is mounted in a conventional chassis, its inherent vibration takes the form of an oscillation of the motor about a neutral axis extending longitudinally of the engine and inclining upwardly from a point at the rear of the engine. I have so designed my motor supports as to permit the engine to oscillate with substantial freedom about this axis. In other words, instead of rigidly tying the engine down to the frame, with or without the interposition of rubber blocks, or springs, as is now common practice, I have provided a mounting permitting the engine to oscillate with more or less freedom in response to its inherent vibration. The result is the elimination of the minute but objectionable thrusts and tugs at the frame which would otherwise be produced by the vibration. This type of mounting is, however, subject to the objection that the engine will tend to swing as a result of external forces, such as rolling and tossing of the car as a consequence of inequalities in the road, travelling around curves, and the like. To overcome this tendency I have equipped my engine with special bracing means designed to resist this movement without, however, interfering with the free oscillation of the engine in response to engine vibration. The bracing means extends from the engine to some fixed part of the vehicle, such as the frame or body, and to avoid the transmission of forces from the engine to the frame or body through these parts, either of the following arrangements may be employed:

Where, as in the case of the engine referred to, the vibration is of fixed amplitude and its frequency varies with the engine speed, the bracing means may be so designed as to, in effect, automatically increase and decrease in length in synchronism with the engine vibrations; that is, as the engine moves away from the point of connection of the bracing means to the frame the over-all length of the bracing means is automatically increased, and as the engine moves toward the point of connection of the bracing means to the frame, the over-all length of the bracing means is decreased. Owing to this mode of connection the bracing means is at no time subject to any appreciable tension or compression, so that no force is transmitted through it to the frame as a consequence of engine vibration, but it nevertheless is at all times effective to resist any tendency of the engine to move in response to extraneous causes, such as swaying or pitching of the vehicle. The automatic adjustment of the bracing means is best accomplished by the engine since it must be in synchronism with the vibration inherent in the operation of the engine. The preferred embodiment of bracing means consists essentially of a brace member whose effective point of connection with the engine is varied in synchronism with the engine vibration by means of suitable mechanical devices such as a cam and lever, the cam being rotated by the engine.

Another form of bracing means, which I likewise have embodied in my preferred motor mounting, consists of a simple strut or brace connected to the engine at a point lying within or very close to the axis of oscillation of the engine, in which case the movement of the engine is along an arc of such small length that it is negligible and the strut may be rigidly connected both to the engine and frame without being subject to appreciable tension or compression as a result of engine vibration. As a consequence no vibrations are transmitted through it.

Not only is it desirable to prevent transmission of engine vibrations to the frame and body, but it is also desirable to prevent transmission of vibration to the driver through such controls as are connected with the engine at points sufficiently far from the axis of vibration as to have appreciable movement. The clutch pedal usually falls within this description. To accomplish the desired result the connections between the pedal and the engine are so designed as to permit free movement of the engine, without, however, transmitting this movement to the pedal.

In the drawings:

Figure 1 is a longitudinal sectional view through an automobile chassis showing an engine mounted therein in accordance with my invention.

Figure 2 is a fragmentary top plan view of the construction shown in Figure 1.

Figure 3 is a view of part of the clutch operating connections taken on line 3—3 of Figure 1.

Figure 7 is a section on line 7—7 of Figure 6.

Figure 8 is a perspective view showing modified forms of front and rear motor mounting.

Figure 9 is a sectional view through the front motor mounting and adjustable bracing means shown in Figure 8.

Figure 10 is a view of the construction of Figure 9 looking from the left side of that figure.

Figure 11 is a section through the rear motor mounting of Figure 8.

Figure 4:
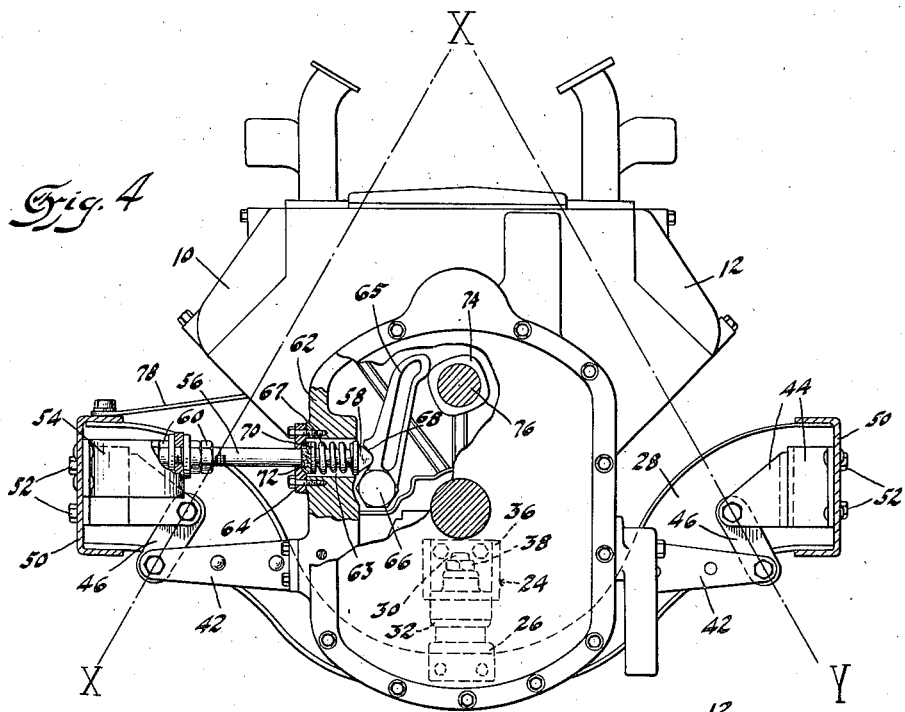
Figure 4 is a front elevation of the engine with parts broken away to show the bracing means.

The form of the invention shown in Figures 1 to 7 will first be described. I have shown in these figures an 8-cylinder internal combustion engine of the V type. One bank of 4 cylinders is indicated at 10 and the other bank is indicated at 12. The angle between the banks is preferably 90°. I have indicated in dotted lines in Figure 1, the crankshaft 14 to which the pistons operating in the cylinders are connected by means of the usual connecting rods, not shown. The shaft illustrated is of the common type having the four throws in one plane, the connecting rods of opposing cylinders being connected to common throws. The engine as so far described is conventional, and it is preferably operated with the usual firing order, 1, 3, 4, 2, for each of the banks of cylinders. The firing is, of course, alternated between the banks of cylinders so that if the cylinders of bank 10 be numbered 1, 3, 5 and 7, and the cylinders of bank 12 be numbered 2, 4, 6 and 8, the actual firing order is 1, 8, 5, 4, 7, 2, 3, 6. The firing order chosen is likewise conventional.

It has long been known that engines of the type illustrated are characterized by an inherent lateral vibration when the engine is in operation. I have found after careful investigation that this lateral vibration is in fact an oscillation about a neutral axis extending longitudinally of the motor. The specific engine illustrated is of the conventional unit power plant type in which the flywheel housing 16 is rigidly secured to the engine block, and to the flywheel housing is secured the transmission housing 18. These parts are then mounted as a unit on the chassis frame 20. I have found after careful experiments with V-8 engines of the unit power plant type such as shown on the drawings that owing to the distribution of masses the engine assembly tends to oscillate about a neutral axis extending centrally of the engine and inclining upwardly from a point in the vicinity of the universal joint 22 to a point above the engine.

The axis of oscillation is indicated by line X—X of Figure 1. This vibration, or oscillation, as is well known, is produced by unbalanced inertia forces resulting from motion of the reciprocating parts such as the pistons and connecting rods, and also by gas torque reaction and other factors. The vibration is characterized by a fixed amplitude, and its frequency varies directly with the engine speed. The amplitude of the vibration is small being usually not more than a few thousandths of an inch from mid-position. However, with present day engine speeds, it is very noticeable and is decidedly objectionable to the occupants of the car. Knowing the character of vibration performed by the engine the problem has been to so mount the engine as to prevent the transmission of the vibration to the chassis.

I have solved this problem by mounting the engine so as to permit it to have substantial freedom of movement with the result that the frame is not subject to the thrusting and tugging that ensues where the engine is rigidly clamped to the frame. Since the rear end of the power plant is very close to the axis of oscillation X—X, the amplitude of the oscillatory movement will be very slight so that a simple type of support may be used. I have illustrated this support at 24 and it is shown in detail in Figure 7. The support consists of a bracket 26 supported on the cross frame member 28, and carrying a stud 30 which passes through aligned perforations in a rubber cup 32, metal cup 34 and bracket 36 bolted to the rear end of the transmission housing 18. Upon the upper end of the stud 30 is threaded the nut 38 for holding the parts assembled. It will be noted that the rubber cup 32 is provided with an annular extension 40 projecting into recess formed in the underside of the bracket 34 and that the aperture in the bracket 34 through which the stud 30 passes is of larger diameter than the stud 30. With this arrangement the extension 40 as well as the cup-shaped design of the rubber member 32 yieldingly permit the engine to have a slight freedom of movement in all directions. As previously pointed out since the support is very close to the axis X—X, this limited amount of freedom of movement is sufficient to take care of the engine vibration.

Figure 5:
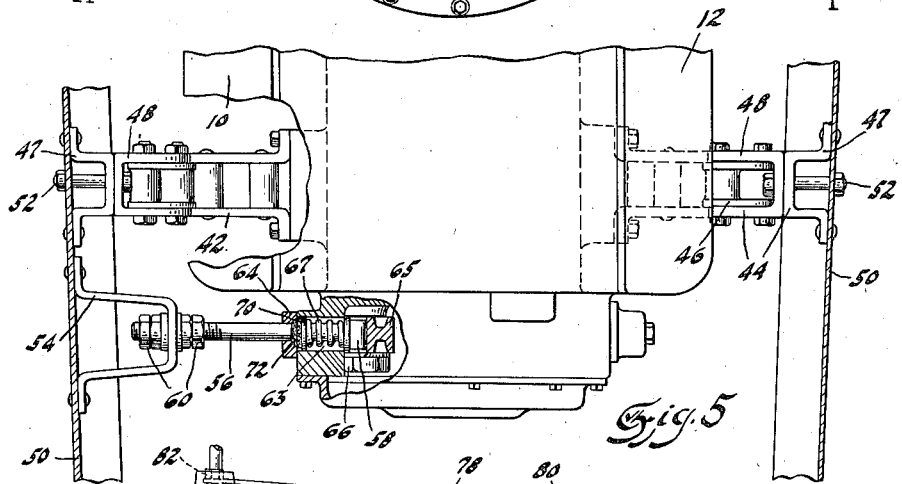
Figure 5 is a top plan view of Figure 4 broken away to show the bracing means and also the method of attachment of the front engine support.
Figure 6:
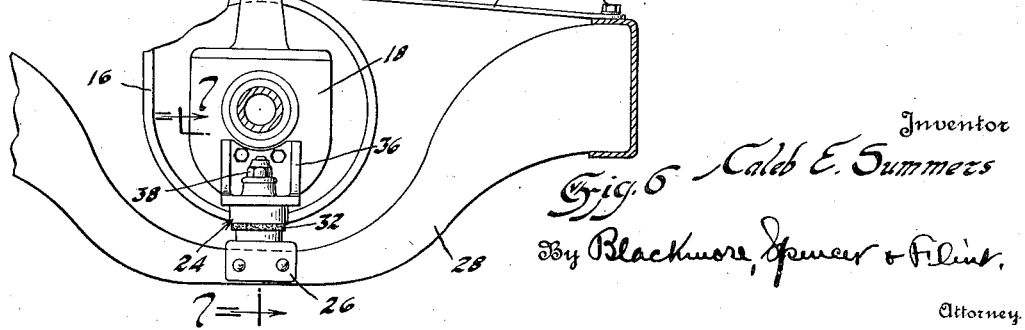
Figure 6 is a view taken on line 6—6 of Figure 2.

The vibration of the forward part of the engine is of considerable amplitude since it is quite a bit removed from the axis of oscillation. The supports for the front end must therefore be designed to permit of considerable movement. The front motor mounting is best shown in Figures 4 and 5, and consists of brackets 42 bolted to the sides of the motor block and suspended from brackets 44 secured to the chassis side frame members, by means of links 46. The brackets 44 may consist of U-shaped members 47 and 48 secured back to back and to the side channel members 50 by means of bolts 52. The links 46 may be of the type commonly used for spring shackles.

I have indicated at X on Figure 4 a point on the axis X—X of Figure 1. The links 46 are preferably so arranged as to normally lie along radii drawn from said point and indicated by the lines X—Y of Figure 4. The arrangement of links as shown permits the engine freedom to oscillate back and forth along a path which is practically indistinguishable from an arc drawn about axis X—X as a center.

With the engine mounted in the manner described there is nothing to prevent its oscillation in response to extraneous forces such as rolling or tossing of the car in its movement over rough roads and around curves. This, of course, is undesirable and I shall now describe the means for preventing such chance movement of the engine. The principle involved in my preferred form of bracing means consists in designing the brace so that it is self-adjusting to take care of changes in positions of the engine in response to its inherent vibration but positively resists chance movement. The bracing means is best shown in Figures 4 and 5, and comprises a bracket 54 bolted to the side frame member 50. From the bracket projects a strut 56 in the form of a bolt having a headed end 58. The strut is adjustably secured to the bracket by means of lock nuts 60. Within an extension 62 of the engine housing is formed a chamber 63, the outer end of which is closed by cover plate 64. Within the chamber is a cam follower in the form of a lever 65 pivoted at 66 to the engine block. The lever is provided with a notch 68 within which is received head 58 of the bolt 56. A coil spring 67 surrounds the stem of the bolt, bearing at one end against the head 58 and at the other end against a plate 70 bolted to the extension 62 of the engine block. Suitable packing is provided about the strut 56 as shown at 72 to prevent the escape of oil. The upper end of the lever 65 is provided with a nose bearing against a four lobed cam 74 mounted on the usual camshaft 76 driven from the engine crankshaft in the customary manner.

The parts of the bracing means are assembled with the spring 67 under compression so as to hold the cam follower 65 against the cam 74. The other end of the strut 56 is then rigidly clamped to the bracket 54. The strut 56 is consequently fixed in position and the effect of rotation of the cam 74 is simply to hold the follower 65 against the head of the strut in all positions which the engine assumes in the course of its vibration. As a consequence, the parts of the bracing means, that is, the strut 56, the cam follower 65 and the cam 74 are always in position to resist chance oscillation of the engine. The effect of the rotation of the cam 74 is not to apply compression to the strut 56 at any time because the movements of the cam and cam follower are synchronized with the engine vibration. This will be made clear if it be assumed that the member 65 is fixed and the engine is swinging from mid position to the right as shown in Figure 4, the effect of this would be to move the member 65 out of contact with the head of the strut 56. As a result the strut would be ineffective to brace the engine. To avoid this the member 65 is made movable and the cam 74 is so designed that at the same time the engine is moving to the right the cam follower 65 is riding up toward a high point on the cam causing the follower to swing to the left and maintain constant engagement with the head of the strut throughout the swing. The reverse operation takes place when the motor swings to the left.

The vibration to which this type of engine is subject is of twice crankshaft frequency so that where the cam is mounted on the camshaft which is driven at half crankshaft speed, it is necessary to provide it with four lobes to synchronize the movement of the bracing means and the engine oscillations. Obviously, the cam if mounted on the crankshaft would require but two lobes.

I have preferred to employ an additional bracing means in the form of a bar 78 bolted at one end 80 to a frame member or other fixed part of the chassis and at the other end 82 to a part of the engine lying substantially in the axis X—X. The amplitude of oscillation of the engine adjacent the point of connection 82 is very small so that a rigid brace may be employed without appreciably interfering with the free swinging of portions of the engine remote from the axis.

In Figures 8 to 11, I have shown a somewhat modified form of mounting. The motor here indicated at 100 is of the same type as that previously described. The adjustable bracing means is likewise of substantially the same design and is indicated by the same reference characters. In this form of the invention the front motor supports instead of being in the form of links take the form of flexible straps 102 hung from brackets 104 bolted to the chassis side frame members 106. To the lower end of the straps 102 are secured brackets 108 bolted to the engine block. As in the case of the links 46 of Fig. 4, the straps 102 normally extend in a radial direction from the axis X—X. The straps may be made of metal or fabric, or a combination of the two, the requisite being that they be flexible to permit the lateral vibration of the engine previously described. If of fabric they may be made in as many plies or layers as desired, and may be impregnated with rubber or the like.

Obviously, in this form of the invention the front motor suspension operates in exactly the same way as in the form first described.

The rear motor support is shown in Figures 8 and 11 and consists of brackets 110 secured to the channel side frame members 106. The rear end of the motor is provided with arms 112 which overlie the brackets 110 and are secured thereto. Between the brackets and the arms are interposed stiff coil springs 114 housed in recesses in the ends of the arms and encircling studs 116 secured to the brackets 110. These springs bear most of the weight of the rear end of the motor. Bolts 118 project through aligned openings in the arms 112 and the brackets 110. Encircling the bolts 118 and positioned directly above and below the arms 110 are resilient cushions 120 housed between metal discs 122. The resilient cushions 120 consist of alternate layers of rubber and fabric. The assembly is held in place by means of the nut 124 threaded on the lower end of bolt 118. The resilient cushions 120 absorb minor shocks and vibrations too small to be appreciably cushioned by the springs 114.

It is obvious that any connection between the motor and frame will serve to transmit vibrations to the frame unless designed to avoid this result, as in the ways pointed out in this application. It is also obvious that vibration will likewise be transmitted through any controls which lead from the motor to the operator. It is hence undesirable to mount the controls upon the motor. In some cases, as in the case of the clutch pedal, it is not possible to avoid a connection with the motor since the clutch itself is housed within the unit power plant. To avoid the transmission of engine vibrations to the clutch pedal, I have developed a special design of clutch pedal linkage as shown in Figures 1 and 2. 120 indicates the lever which engages the clutch operating yoke, not shown. This lever customarily swings about a vertical axis. The clutch pedal is indicated at 122 and is mounted on a rock shaft 124 carried by bracket 126 bolted to the cross frame member 28. Upon the same pivot 124 is mounted the brake operating lever 130, but with this we are not concerned. 132' indicates a spring which yieldingly holds the clutch pedal in its rearward position. In the usual construction the arm 132 projecting from the lower end of the clutch pedal would be connected with the lever 120 by means of a horizontally extending link but with this construction the lateral vibration of the motor carrying with it the arm 120 and link 134 would produce a backward and forward oscillation of the clutch pedal 122. Since the parts 120 and 134 oscillate about the axis X—X as a center they move slightly fore and aft as well as up and down. With the horizontally extending link the entire fore and aft component of the vibration of the engine is available to oscillate the clutch pedal. To avoid this difficulty I have so arranged the clutch operating lever 120 and the arm 132 that the link 134 connecting them will extend in a direction parallel to the axis X—X. I have likewise provided a swinging connection between the link 134 and the arm 132. With this construction the inherent oscillation of the motor will carry the lever 120 and link 134 with it causing the latter to rock in the joint provided in the arm 132 without producing any appreciable oscillation of the pedal 122. I have found that upon actual test that this arrangement entirely prevents transmission of engine vibrations to the driver through the clutch pedal.

I have disclosed in this application a motor mounting designed especially for V-8 engines. I have found by actual test of a number of experimental automobiles equipped with this mounting that the objectionable engine vibrations are prevented from reaching the chassis and hence cause no discomfort to the occupants. It will be understood, that the principles of this mounting are applicable to other types of engines possessing similar vibrations and also to other machines subject to the same difficulty. I have in mind, specifically, pumps and compressors such as commonly used in household refrigerators, electric motors and the like as being devices to which my improved mounting may be applied. It is my intention to cover the various uses of this mounting in this patent application.

The special clutch pedal mounting is applicable to all kinds of engines whatever be the character of the vibration as the linkages may always be designed in accordance with the principles here outlined so as to make it impossible for the engine vibrations to reach the operator.

It is to be understood that the references in this application to "front" and "rear" of the engine, to "downward" inclination of axes, etc., are to be construed in a relative sense and not in an absolute sense, since in other arrangements of the engine and its support the parts may have other positions but may function in identical fashion.

In the interests of brevity the term "chance vibration" is employed to designate vibration or shifting of the motor other than the inherent vibration incident to the operation of the engine.

The "neutral axis" referred to herein is the axis about which the engine, power plant, or other machine oscillates when substantially free to move in response to forces inherent in its operation.

I claim:

1. An engine or the like of the type that is subject to oscillation about a longitudinal axis under the action of forces inherent in its operation, a support, means for mounting the engine on the support so as to permit it to have substantially free oscillatory movement about said axis in response to said forces, bracing means for the engine to resist chance vibration, and means operated by the engine for adjusting said bracing means.

2. An engine or the like of the type that is subject to oscillation about a longitudinal axis under the action of forces inherent in its operation, a support, means for mounting the engine on the support so as to permit it to have substantially free oscillatory movement about said axis in response to said forces, a strut connected to the support and engaging the engine and adapted to resist chance vibration of the engine, and means operated by the engine for adjusting the point of contact of said strut and the engine.

3. An engine or the like of the type that is subject to oscillation about a longitudinal axis under the action of forces inherent in its operation, a support, means for mounting the engine on the support so as to permit it to have substantially free oscillatory movement about said axis in response to said forces, and bracing means for the engine adapted to resist chance vibration thereof, including a strut secured to the frame, a lever engaging the strut, and means driven by the engine for adjusting the position of the lever.

4. An engine or the like of the type that is subject to oscillation about a longitudinal axis under the action of forces inherent in its operation, a support, means for mounting the engine on the support so as to permit it to have substantially free oscillatory movement about said axis in response to said forces, and bracing means for the engine adapted to resist chance vibration thereof, including a strut secured to the frame, a lever pivoted to the engine, a cam driven by the engine and engaging the free end of the lever, said lever being in bracing contact with said strut at an intermediate point.

5. The combination with an automobile chassis frame and an internal combustion engine assembly with pistons and cranks so arranged that unbalanced forces are produced by the operation of the engine tending to cause vibrations of the engine about a longitudinal axis and with the mass of the assembly so distributed relatively to the point of application of the forces as to cause said axis to be inclined downwardly from front to rear, of means connecting said assembly to said frame comprising supporting means at the front of the engine adapted to permit substantially free oscillation of the engine assembly about said axis and additional supporting means at the rear of the engine assembly located in close proximity to said axis.

6. An engine or the like of the type that is subject to inherent oscillatory vibration about an axis inclining downwardly from a point adjacent the front of the engine, a support for the rear of the engine lying adjacent said axis, and supporting means for the front of the engine designed to permit said inherent oscillatory vibration, and means for resisting chance vibration of the engine.

7. In an automobile, in combination, a chassis frame, an engine in the chassis frame arranged to propel the automobile, said engine being subject to inherent oscillatory vibration about an axis inclining downwardly from a point adjacent the front of the chassis under the action of forces inherent in its operation, supports for the engine mounted on the chassis and designed to permit said inherent oscillatory vibration, and independent means for limiting the amplitude of movement of the engine.

8. An engine or the like having a drive shaft, said engine being of the type that is subject to oscillation about an axis non-coincident with the axis of the drive shaft under the action of forces inherent in its operation, a support, and means for mounting the engine on the support arranged to permit the engine to have substantially free oscillatory movement about said axis in response to said forces, and independent means for restraining the movement of the engine without interfering substantially with said oscillation.

9. In an automobile the combination of a chassis including wheel driving means, an engine in the chassis comprising a crankshaft, cylinders, pistons in the cylinders arranged to drive the crankshaft, a connection between one end of said crankshaft and the wheel driving means, said engine being subject to oscillation about a longitudinal axis non-coincident with the axis of said crankshaft under the action of forces inherent in the operation of the engine, and means for mounting the engine in the chassis arranged to permit the engine to have substantially free oscillatory movement about said longitudinal axis in response to said forces, and independent means connecting said engine and chassis for restraining the movement of said engine.

10. In an automobile the combination of a chassis having a propeller shaft, an engine in the chassis comprising a crankshaft, cylinders, pistons in the cylinders connected to drive the crankshaft, a transmission unit rigidly mounted on said engine and operatively connected at one end with said crankshaft and at the other end with the propeller shaft, said engine and transmission being subject to oscillation about a longitudinal axis non-coincident with the axis of said crankshaft under the action of forces inherent in the operation of the engine, and means for mounting the engine and transmission in the chassis arranged to permit the engine to have substantially free oscillatory movement about said longitudinal axis in response to said forces, and independent means connecting said engine and chassis for restraining the movement of said engine.

11. The combination with a motor vehicle frame and an engine unit which has a tendency to oscillatory movement during operation, of two spaced non-metallic and yieldable mountings supported by the frame upon which the engine unit is mounted, said mountings adapted to yield slightly to such tendency to oscillatory movement of the engine unit with respect to the frame under the impulses of the engine unit when in operation, the axes of the engine crank shaft and of the oscillatory movement of the engine unit intersecting at one end of the unit and a stabilizing connection between the engine unit and the frame.

12. The combination with a unit power plant including an internal combustion engine having a crankshaft and a power transmission mechanism at one end adapted for connection with universal joint drive means and a support, of resilient connections between the support and power plant arranged near opposite ends of the power plant and constructed to accommodate power plant oscillation due to engine operation reactions about an axis inclined to the axis of the engine crankshaft and intersecting the same at the end adjacent said transmission mechanism, said connections imposing no substantial restriction on oscillation of the power plant such as would cause the oscillation to manifest itself in objectionable thrusts and tugs at the frame.

13. The combination of an engine or the like having a drive shaft and having its masses so disposed that it is subject to oscillation about a longitudinal neutral axis extending at an angle to the drive shaft under the action of forces inherent in its operation, a supporting frame, and means for mounting the engine on the frame for oscillation about said axis so as to offer substantially no resistance to such oscillation and prevent the oscillation from manifesting itself in objectionable thrusts and tugs at the frame.

14. In an automobile or the like the combination of an engine having a drive shaft, a propeller shaft, means connecting the propeller shaft to the rear end of the drive shaft, said engine having its masses so disposed that it is subject to oscillation about a neutral axis inclined downwardly from front to rear and intersecting the drive shaft axis adjacent its connection with the propeller shaft under the action of forces inherent in the operation of the engine, a supporting frame, and means for mounting the engine on the frame for substantially unrestrained pivotal movement about said axis, thereby preventing the oscillation from manifesting itself in objectionable thrusts and tugs at the frame.

15. In an automobile or the like the combination of an engine having a drive shaft, a propeller shaft, means connecting the propeller shaft to the rear end of the drive shaft, said engine having its masses so disposed that it is subject to oscillation about a neutral axis inclined downwardly from front to rear and intersecting the drive shaft axis adjacent its connection with the propeller shaft under the action of forces inherent in the operation of the engine, a supporting frame, and means spaced along said axis mounting the engine on the frame for pivotal movement about said axis, thereby preventing the oscillation from manifesting itself in objectionable thrusts and tugs at the frame, one of said mountings being located adjacent the connection of the propeller shaft to the drive shaft.

16. In an automobile or the like the combination of an engine having a drive shaft, a propeller shaft, means connecting the propeller shaft to the rear end of the drive shaft, said engine having its masses so disposed that it is subject to oscillation about a neutral axis inclined downwardly from front to rear with respect to the drive shaft under the action of forces inherent in the operation of the engine, a supporting frame, and yieldable means mounting the engine on the frame for yieldingly cushioned pivotal movement about said axis, thereby preventing the oscillation from manifesting itself in objectionable thrusts and tugs at the frame.

17. In an automobile or the like the combination of a unit power plant including an engine having a drive shaft and a transmission connected to the rear thereof, said engine and transmission being secured together as a unit, a propeller shaft connected to the drive shaft through said transmission, said power plant having its masses so disposed that it is subject to oscillation about a neutral longitudinal axis inclined downwardly from a point above the drive shaft at the front thereof under the action of forces inherent in the operation of the power plant, a supporting frame, and means for mounting the power plant on the frame, said means being so oriented with respect to said axis as to condition the power plant for substantially unrestrained oscillation about said axis so as to prevent the power plant from thrusting and tugging at the frame.

CALEB E. SUMMERS.